(12) United States Patent
Fonda et al.

(10) Patent No.: US 10,924,042 B2
(45) Date of Patent: *Feb. 16, 2021

(54) PNEUMATIC ENERGY HARVESTING AND MONITORING

(71) Applicant: The Boeing Company, Chicago, IL (US)

(72) Inventors: James William Fonda, Summerville, SC (US); Raymond J. Slesinski, Arnold, MO (US)

(73) Assignee: The Boeing Company, Chicago, IL (US)

( * ) Notice: Subject to any disclaimer, the term of this patent is extended or adjusted under 35 U.S.C. 154(b) by 386 days.

This patent is subject to a terminal disclaimer.

(21) Appl. No.: 15/594,459

(22) Filed: May 12, 2017

(65) Prior Publication Data
US 2017/0250638 A1    Aug. 31, 2017

Related U.S. Application Data

(63) Continuation of application No. 14/753,190, filed on Jun. 29, 2015, now abandoned, which is a
(Continued)

(51) Int. Cl.
*H02P 9/00* (2006.01)
*H02S 10/20* (2014.01)
(Continued)

(52) U.S. Cl.
CPC ............. *H02P 9/008* (2013.01); *F04B 51/00* (2013.01); *F15B 19/005* (2013.01); *G01D 21/00* (2013.01);
(Continued)

(58) Field of Classification Search
CPC .... F04B 51/00; F04B 2205/04; F15B 19/005; G01L 9/00; G01L 19/0007; H02K 7/1807; H02S 10/20; H02P 9/008; G01D 21/00

See application file for complete search history.

(56) References Cited

U.S. PATENT DOCUMENTS 5,419,135 A    5/1995   Wiggs
5,843,212 A    12/1998  Nanaji
(Continued)

FOREIGN PATENT DOCUMENTS

FR          2824907 A1    11/2002

OTHER PUBLICATIONS

PCT Search Report for application PCT/US2010/045212 dated Nov. 5, 2010, 12 pages.
(Continued)

*Primary Examiner* — Alexander Satanovsky
(74) *Attorney, Agent, or Firm* — Yee & Associates, P.C.

(57) ABSTRACT

An apparatus including a pneumatic system; an energy harvesting unit configured to generate electrical energy from a compressed gas in the pneumatic system; a battery connected to the energy harvesting unit; a sensor disposed to detect a first parameter regarding operation of the energy harvesting unit; and a controller connected to the sensor and the energy harvesting unit. The sensor and the controller are powered by the energy harvesting unit. The controller is configured to control the energy harvesting unit and to process measurements for the first parameter detected by the sensor. The controller is further programmed with a learning system configured to diagnose an operational condition of the energy harvesting unit based on the measurements for the first parameter, and to issue a command to the controller based on the operational condition.

3 Claims, 11 Drawing Sheets

Related U.S. Application Data continuation of application No. 12/565,116, filed on Sep. 23, 2009, now Pat. No. 9,146,141.

(51) Int. Cl.

| | | |
|---|---|---|
| *F04B 51/00* | (2006.01) | |
| *F15B 19/00* | (2006.01) | |
| *G01D 21/00* | (2006.01) | |
| *G01L 1/26* | (2006.01) | |
| *H02K 7/18* | (2006.01) | |

(52) U.S. Cl.
CPC .............. *G01L 1/26* (2013.01); *H02K 7/1807* (2013.01); *H02S 10/20* (2014.12); *F04B 2205/04* (2013.01)

(56) References Cited

U.S. PATENT DOCUMENTS

| | | |
|---|---|---|
| 5,899,411 A | 5/1999 | Latos et al. |
| 6,051,958 A | 4/2000 | Hwang |
| 6,201,314 B1 | 3/2001 | Landry |
| 6,281,594 B1 | 8/2001 | Sarich |
| 6,957,536 B2 | 10/2005 | Litwin et al. |
| 6,981,377 B2 | 1/2006 | Vaynberg et al. |
| 8,525,361 B1* | 9/2013 | Kramer ................ G05B 19/44 290/43 |
| 9,146,141 B2 | 9/2015 | Fonda et al. |
| 2004/0232890 A1 | 11/2004 | Ariga et al. |
| 2005/0024015 A1* | 2/2005 | Houldsworth ........ H02J 7/0016 320/119 |
| 2005/0034023 A1* | 2/2005 | Maturana ............... G06Q 10/06 714/37 |
| 2006/0061107 A1 | 3/2006 | Cadaret |
| 2007/0114422 A1* | 5/2007 | Berkcan ................ B64D 43/00 250/358.1 |
| 2007/0288103 A1* | 12/2007 | Choudhury ........ G05B 23/0229 700/35 |
| 2008/0066796 A1 | 3/2008 | Mitchell et al. |
| 2008/0127512 A1 | 6/2008 | Barclay |
| 2009/0282822 A1* | 11/2009 | McBride ................ F15B 1/024 60/415 |
| 2009/0288695 A1 | 11/2009 | Jaisinghani |
| 2010/0045241 A1 | 2/2010 | Nousiainen |
| 2010/0164705 A1 | 7/2010 | Blanchard |
| 2011/0071774 A1 | 3/2011 | Fonda et al. |
| 2013/0320989 A1* | 12/2013 | Inoue ................ G01R 31/3842 324/427 |
| 2014/0320301 A1* | 10/2014 | Hudson ................ E21B 17/003 340/854.4 |
| 2015/0316049 A1 | 11/2015 | Fonda et al. |
| 2016/0278010 A1* | 9/2016 | Nishibayashi .... H04W 52/0219 |
| 2017/0338665 A1* | 11/2017 | Long ..................... H02J 7/0027 |

OTHER PUBLICATIONS

Office Action, dated Sep. 27, 2012, regarding U.S. Appl. No. 12/565,116, 18 pages.
Final Office Action, dated May 25, 2013, regarding U.S. Appl. No. 12/565,116, 23 pages.
Office Action, dated Feb. 13, 2014, regarding U.S. Appl. No. 12/565,116, 24 pages.
Final Office Action, dated Jul. 15, 2014, regarding U.S. Appl. No. 12/565,116, 31 pages.
Notice of Allowance, dated Mar. 3, 2015, regarding U.S. Appl. No. 12/565,116, 9 pages.
Office Action, dated Aug. 2, 2018, regarding U.S. Appl. No. 14/753,190, 19 pages.

* cited by examiner

PNEUMATIC ENERGY HARVESTING AND MONITORING

This application is a continuation-in-part application of U.S. patent application Ser. No. 14/753,190, filed Jun. 29, 2015; which is a continuation application of U.S. patent application Ser. No. 12/565,116, filed Sep. 23, 2009, now U.S. Pat. No. 9,146,141.

BACKGROUND INFORMATION

1. Field

The present disclosure relates generally to energy harvesting units, and in particular, to energy harvesting units that generate electrical energy from movement of fluids. Still more particularly, the present disclosure relates to a method and apparatus for generating electrical energy from a pneumatic system and monitoring a pneumatic system.

2. Background

Pneumatic systems use pressurized gas to generate mechanical energy. For example, pneumatic systems are often used in manufacturing and maintenance environments to operate equipment. For example, drills, sanders, fastener installation tools, rivet guns, and/or other equipment may be operated using a compressed gas. In an environment in which a pneumatic system is used, gas lines connect a gas compressor system to equipment. The pneumatic system may use compressed gasses such as air, helium, neon, nitrogen, and other suitable gasses.

Pneumatic systems are used, because these systems have long operating lives compared to other types of systems and low maintenance requirements.

Although pneumatic systems have low maintenance requirements, monitoring of these systems is still desirable to identify degradation in performance that may require maintenance. For example, different types of equipment connected to the pneumatic system may require different amounts of pressures for operation. If the pressure in one or more gas lines is less than the pressure needed for the equipment attached to those gas lines, maintenance may be required. This maintenance may involve identifying gas lines in which potential defects may be present. Maintenance also may involve adjusting the amount of pressure provided by different gas lines.

Monitoring of these systems is performed using monitoring devices. These monitoring devices often run on electricity. Electrical lines are installed to the locations in which the monitoring devices are present to provide power to operate the monitoring devices. These monitoring devices may monitor various components of the pneumatic system. For example, gas lines may be monitored for parameters such as, for example, gas, flow, pressure, moisture, and/or other suitable parameters. These monitoring devices have displays that may be read by a human operator to determine whether the parameters are within desired levels or ranges.

Installation of monitoring devices may be difficult, depending on the location. Some locations may be difficult to reach. Locations that are difficult to reach also may be more difficult to access for maintenance or reading parameters, in addition to being more difficult to install. Further, depending on the number of monitoring devices installed, the number of wires needed to provide power to the monitoring devices may be bulky or difficult to connect to the power source.

One solution involves employing monitoring devices that use batteries. However, maintenance costs for these types of monitoring systems increase when batteries are present. The batteries require maintenance when they become depleted.

Accordingly, it would be illustrative to have a method and apparatus which takes into account one or more of the issues discussed above, as well as possibly other issues.

SUMMARY

In one illustrative example, an apparatus comprises a number of sensors configured to detect a number of parameters, an energy harvesting unit, and a controller connected to the number of sensors and the energy harvesting unit. The energy harvesting unit is configured to generate electrical energy from a compressed gas in a pneumatic system. The controller is configured to process measurements for the number of parameters detected by the number of sensors. The number of sensors and the controller are powered by the energy harvesting unit.

In another illustrative example, an apparatus comprises a number of sensors configured to detect a number of parameters in a fluid system, an energy harvesting unit, and a controller. The energy harvesting unit is configured to generate electrical energy from a fluid in the fluid system. The controller is in communication with the number of sensors and the energy harvesting unit. The controller is configured to process measurements for the number of parameters detected by the number of sensors and control operation of the energy harvesting unit. The number of sensors and the controller are powered by the electrical energy generated by the energy harvesting unit.

In yet another illustrative example, a method is present for monitoring a pneumatic system. A number of parameters are monitored using a monitoring device connected to the pneumatic system, an energy harvesting unit configured to generate electrical energy from a gas in the pneumatic system, and a controller. The monitoring device comprises a number of sensors configured to detect the number of parameters. The controller is in communication with the number of sensors and the energy harvesting unit and is configured to process measurements for the number of parameters detected by the number of sensors and control operation of the energy harvesting unit. The number of sensors and the controller are powered by the energy harvesting unit. The monitoring device is powered using the electrical energy generated by the energy harvesting unit.

The illustrative examples also provide for an apparatus including a pneumatic system; an energy harvesting unit configured to generate electrical energy from a compressed gas in the pneumatic system; a battery connected to the energy harvesting unit; a sensor disposed to detect a parameter regarding operation of the energy harvesting unit; and a controller connected to the sensor and the energy harvesting unit. The sensor and the controller are powered by the energy harvesting unit. The controller is configured to control the energy harvesting unit and to process measurements for the parameter detected by the sensor. The controller is further programmed with a learning system configured to diagnose an operational condition of the energy harvesting unit based on the measurements for the parameter, and to issue a command to the controller based on the operational condition.

The illustrative examples also provide for a method. The method includes operating a pneumatic system attached to a pneumatic tool. The method also includes generating electrical energy from an energy harvesting unit using a compressed gas in the pneumatic system. The method also includes storing at least some of the electrical energy in a battery connected to the energy harvesting unit. The method also includes detecting a parameter regarding operation of the energy harvesting unit using a sensor disposed to detect the parameter. The method also includes operating a controller connected to the sensor and the energy harvesting unit. Operation of the controller includes using the controller to power the sensor and the controller using at least some of the electrical energy from the energy harvesting unit. Operation of the controller also includes controlling, using the controller, the energy harvesting unit to process measurements for the parameter detected by the sensor. Operation of the controller also includes diagnosing, using a learning system programmed into the controller, an operational condition of the energy harvesting unit based on the measurements for the parameter. Operation of the controller also includes issuing a command to the controller based on the operational condition.

The illustrative examples also provide for a manufacturing system. The manufacturing system includes a first pneumatic system connected to a gas line and to a first pneumatic tool configured for use in manufacturing an object, the first pneumatic system including a first energy harvesting unit configured to use gas from the gas line to generate electrical energy, a first battery connected to the first energy harvesting unit, and a first sensor disposed to detect a first parameter regarding operation of the first pneumatic system. The manufacturing system also includes a second pneumatic system connected to the gas line and to a second pneumatic tool configured for use in manufacturing the object, the second pneumatic system including a second energy harvesting unit configured to use gas from the gas line to generate electrical energy, a second battery connected to the second energy harvesting unit, and a second sensor disposed to detect a second parameter regarding operation of the second pneumatic system. The manufacturing system also includes a controller in communication with the first pneumatic system and the second pneumatic system, the controller programmed to monitor the first parameter and the second parameter, and to control operation of at least two of the first pneumatic system, the second pneumatic system, and the gas line based on an analysis of the first parameter and the second parameter.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives, and advantages thereof, will best be understood by reference to the following detailed description of an illustrative example of the present disclosure when read in conjunction with the accompanying drawings, wherein:

DETAILED DESCRIPTION

Figure 1:
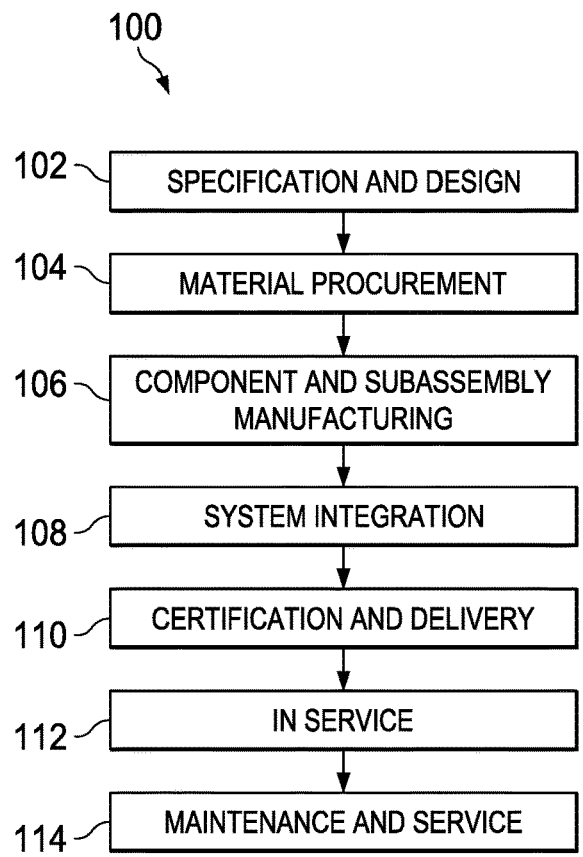
FIG. 1 is an illustration of an aircraft manufacturing and service method in which an illustrative example may be implemented.
Figure 2:
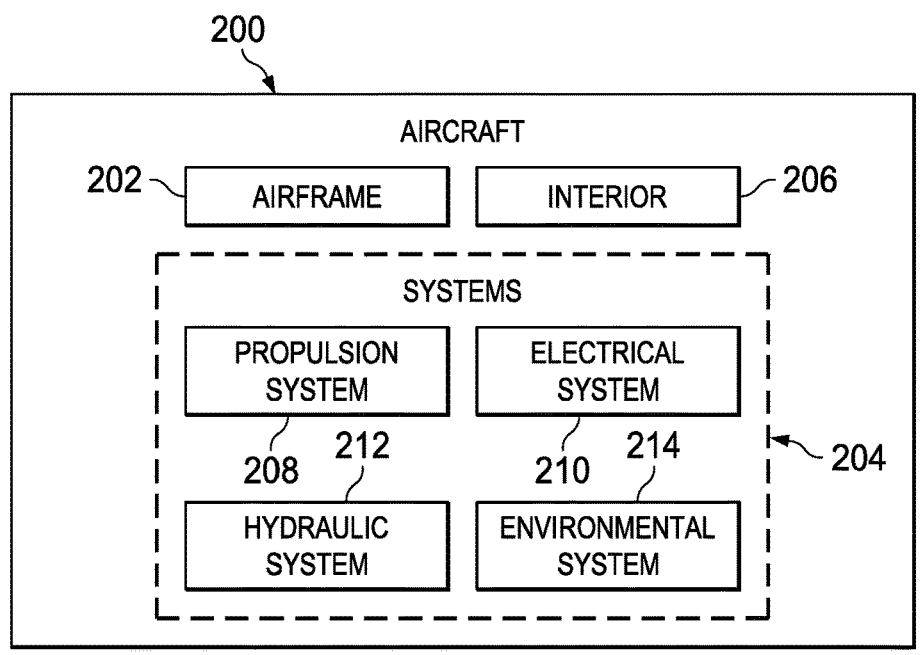
FIG. 2 is an illustration of an aircraft in accordance with an illustrative example.

Referring more particularly to the drawings, examples of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative example. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an illustrative example may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included.

Although an aerospace example is shown, different illustrative examples may be applied to other industries, such as the automotive or ship building industry. As additional examples, the different illustrative examples may be implemented in still other manufacturing, service, and construction environments. For example, the different illustrative examples may be implemented in a ship building facility, an automobile manufacturing plant, a ship, a spacecraft, an aircraft, a maintenance facility, and/or other suitable environments.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced during component and subassembly manufacturing 106 in FIG. 1 may be fabricated or manufactured in a manner similar to components or subassemblies produced while aircraft 200 is in service 112 in FIG. 1. As yet another example, a number of apparatus examples, method examples, or a combination thereof may be utilized during production stages, such as component and subassembly manufacturing 106 and system integration 108 in FIG. 1.

A number, when referring to items, means one or more items. For example, a number of apparatus examples is one or more apparatus examples. A number of apparatus examples, method examples, or a combination thereof may be utilized while aircraft 200 is in service 112 and/or during maintenance and service 114 in FIG. 1. The use of a number of the different illustrative examples may substantially expedite the assembly of and/or reduce the cost of aircraft 200.

A number of the different illustrative examples may be implemented in one or more steps in aircraft manufacturing and service method 100. For example, the different illustrative examples may be used to monitor fluid systems used to power equipment employed during, for example, component and subassembly 106, system integration 108, and maintenance and service 114.

The different illustrative examples recognize and take into account a number of different considerations. For example, the different illustrative examples recognize and take into account that currently used monitoring devices require increased work by human operators. Currently, a human operator moves to each of the monitoring devices to obtain measurements about the parameters for the pneumatic system in different locations. Some of these locations may be difficult to reach in order to read displays when making measurements. As one example, some monitoring devices may be located with gas lines in the rafters of a building in which a pneumatic system is present for operating equipment.

The different illustrative examples recognize and take into account that currently available monitoring devices of pneumatic systems include monitoring devices that use electrical lines or non-rechargeable batteries for power. The use of electrical lines results in an increase in expense to install and maintain the devices. Further, batteries need to be maintained at different intervals.

Further, this maintenance may be made more difficult by the location of the monitoring devices. As another example, maintenance may be required for a monitoring device in a location behind equipment which is not easily accessible for maintenance by a human operator.

Thus, the different illustrative examples provide a method and apparatus for monitoring a fluid system, such as a pneumatic system. In one illustrative example, an apparatus comprises a number of sensors, an energy harvesting unit, and a controller. The number of sensors is configured to detect a number of parameters in a fluid system. The energy harvesting unit is configured to generate energy from a fluid in the fluid system into electrical energy. The controller is connected to the number of sensors and the energy harvesting system. The controller is configured to process measurements for the number of parameters detected by the number of sensors. The number of sensors and the controller are powered by the electrical energy generated by the energy harvesting unit.

Additionally, the controller may communicate with a computer system through a wireless communications link. As a result, information from different apparatus making the measurements can be received, analyzed, and/or presented in a location that may be more convenient to a human operator.

Figure 3:
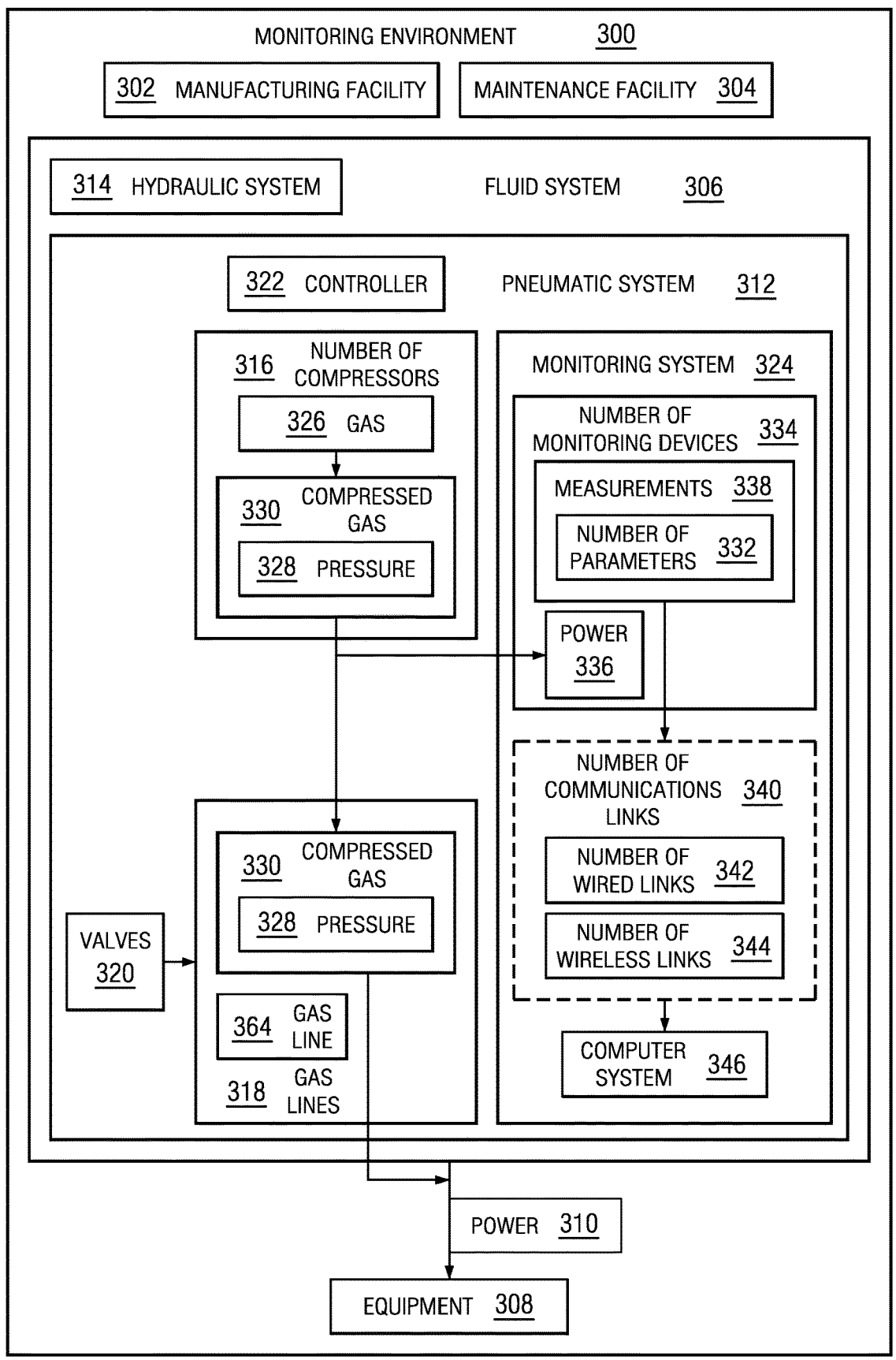
FIG. 3 is an illustration of a monitoring environment in accordance with an illustrative example.

Turning now to FIG. 3, an illustration of a monitoring environment is depicted in accordance with an illustrative example. In this example, monitoring environment 300 is an example of an environment that may be used in aircraft manufacturing and service method 100 in FIG. 1. Monitoring environment 300 may be used to manufacture and/or maintain aircraft 200 in FIG. 2. For example, monitoring environment 300 may be used during component and subassembly manufacturing 106, system integration 108, maintenance and service 114 in FIG. 1, and/or in other suitable operations.

In this illustrative example, monitoring environment 300 may include at least one of manufacturing facility 302, maintenance facility 304, and/or some other suitable location. Monitoring environment 300 includes fluid system 306 and equipment 308. Equipment 308 may include, for example, without limitation, a drill, a sander, a fastener installation tool, a rivet, a paint tool, a saw, and/or other suitable equipment.

Fluid system 306 provides power 310 to operate equipment 308. Power 310 takes the form of mechanical or kinetic energy in the depicted examples. Fluid system 306, in these examples, takes the form of pneumatic system 312. Of course, fluid system 306 may take other forms such as, for example, without limitation, hydraulic system 314 and/or any other suitable type of system in which a fluid is used to generate power 310.

In this particular example, pneumatic system 312 comprises number of compressors 316, gas lines 318, valves 320, controller 322, and monitoring system 324. Of course, other components not illustrated may be included within pneumatic system 312. For example, pneumatic system 312 also may include couplers to connect equipment 308 to gas lines 318, switches, booster units, timers, and/or other suitable components.

Number of compressors 316 places gas 326 under pressure 328 to generate compressed gas 330. Pressure 328 of compressed gas 330, in these depicted examples, is from about 80 pounds per square inch to about 100 pounds per square inch. A particular pressure level may be selected or a range of pressure levels may be present for compressed gas 330 in different lines within gas lines 318.

In these examples, compressed gas 330 may be selected from at least one of air, an inert gas, nitrogen, helium, or some other suitable type of gas. The particular type of gas selected may depend on equipment, manufacturing requirements, and/or safety requirements.

Gas lines 318 distribute compressed gas 330 from number of compressors 316 to equipment 308. Equipment 308 is operated using compressed gas 330. The flow of compressed gas 330 within gas lines 318 is controlled using valves 320 in these illustrative examples. Valves 320 may be used to selectively direct the flow of compressed gas 330 to different lines within gas lines 318. Further, valves 320 also may be used to change pressure 328 of compressed gas 330 in different lines within gas lines 318.

In this illustrative example, monitoring system 324 monitors number of parameters 332 within pneumatic system 312. Number of parameters 332 may include, for example, without limitation, pressure, air flow, moisture, amount of particulates, and/or other suitable parameters. The parameters selected for number of parameters 332, in these illustrative examples, are parameters that may affect the performance of pneumatic system 312 and/or equipment 308 in monitoring environment 300. Of course, other types of parameters may be selected.

Monitoring system 324 is distributed within pneumatic system 312. In these illustrative examples, monitoring system 324 comprises number of monitoring devices 334 and computer system 346. Number of monitoring devices 334 detects number of parameters 332.

As number of parameters 332 is detected, measurements 338 containing number of parameters 332 is sent by number of monitoring devices 334 to computer system 346. Computer system 346 may be one or more computers in communication with each other. In these examples, number of monitoring devices 334 sends measurements 338 to computer system 346 using number of communications links 340.

Number of communications links 340 may take various forms. For example, without limitation, number of communications links 340 may take the form of number of wired links 342, number of wireless links 344, and/or other suitable types of communications links. In these illustrative examples, number of wireless links 344 may be used to reduce the amount of wiring needed within monitoring environment 300. Further, with the use of number of wireless links 344, the amount of labor needed to install number of monitoring devices 334 also may be reduced.

In these depicted examples, number of monitoring devices 334 generate power from pneumatic system 312 and do not require wires or cables that are connected to a remote power source. More specifically, in these illustrative examples, number of monitoring devices 334 generates power 336 using compressed gas 330 flowing through pneumatic system 312. Number of monitoring devices 334 is associated with or connected to pneumatic system 312 such that compressed gas 330 flows through number of monitoring devices 334 to generate power 336 for number of monitoring devices 334. As one illustrative example, number of monitoring devices 334 may be attached to or placed in line with gas lines 318.

As a result, power lines and batteries are not required to operate number of monitoring devices 334. Also, the amount of labor needed to install this type of system may be reduced. Further, maintenance requirements also may be reduced as compared to a monitoring system in which monitoring devices use batteries. With this type of implementation, maintenance for batteries may be reduced or eliminated.

The illustration of monitoring environment 300 in FIG. 3 is not meant to imply physical or architectural limitations to the manner in which other illustrative examples may be implemented. Other components, in addition to and/or in place of the ones illustrated, may be used. Some components may be unnecessary in some illustrative examples. Also, the blocks are presented to illustrate some functional components. One or more of these blocks may be combined and/or divided into different blocks when implemented in different illustrative examples.

For example, in other illustrative examples, number of monitoring devices 334 may be placed in other locations other than being in line with gas lines 318. In some illustrative examples, one or more of number of monitoring devices 334 may be attached to valves 320.

As another example, number of monitoring devices 334 may be implemented in other environments in addition to or instead of manufacturing facility 302 and maintenance facility 304. For example, the different illustrative examples may be implemented in other types of platforms. For example, without limitation, other illustrative examples may be applied to a mobile platform, a stationary platform, a land-based structure, an aquatic-based structure, a space-based structure and/or some other suitable platform. More specifically, the different illustrative examples may be applied to, for example, without limitation, a submarine, a bus, a personnel carrier, a tank, a train, an automobile, a spacecraft, a space station, a satellite, a surface ship, a power plant, a dam, a building, and/or some other suitable platform.

Figure 4:
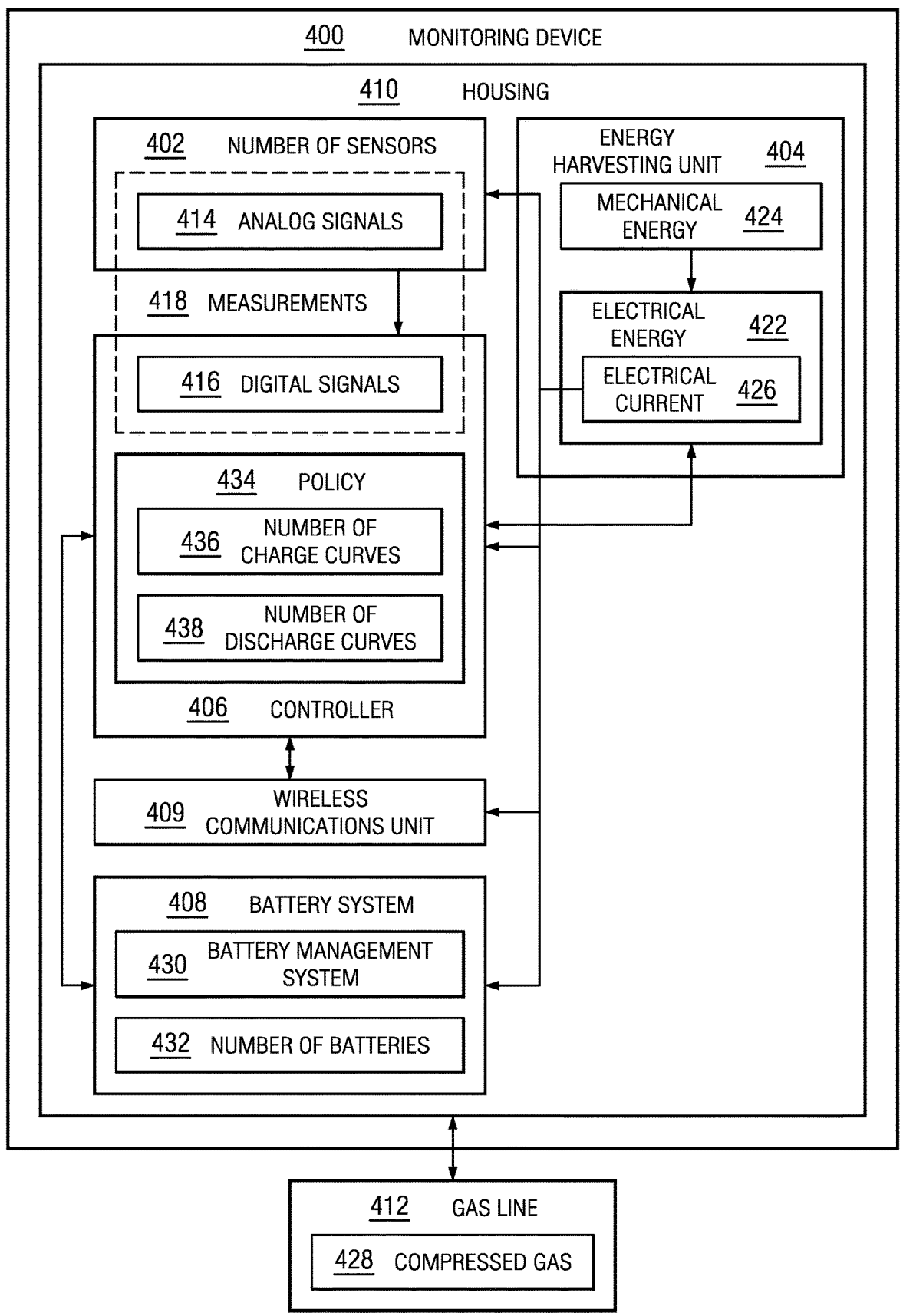
FIG. 4 is an illustration of a monitoring device in accordance with an illustrative example.

With reference now to FIG. 4, an illustration of a monitoring device is depicted in accordance with an illustrative example. In this illustrative example, monitoring device 400 is an example of one implementation for a monitoring device within number of monitoring devices 334 in FIG. 3.

As illustrated, monitoring device 400 comprises number of sensors 402, energy harvesting unit 404, controller 406, battery system 408, and housing 410. Number of sensors 402, energy harvesting unit 404, controller 406, wireless communications unit 409, and battery system 408 are associated with housing 410 in these examples.

In this illustrative example, housing 410 is connected to gas line 412. Gas line 412 is an example of a gas line within gas lines 318 in FIG. 3.

A sensor within number of sensors 402 is a device that measures a physical quantity and converts that measure into a signal. Number of sensors 402 may include, for example, without limitation, a particulate sensor, a flow sensor, a moisture sensor, a temperature sensor, a pressure sensor, a carbon dioxide sensor, a microphone, a hydrogen sensor, a particle detector, and/or other suitable types of sensors.

In this illustrative example, controller 406 controls the operation of monitoring device 400. Controller 406 may be implemented using a number of different types of devices. For example, controller 406 may be a processor, a multi-core processor, a plurality of processors, an application specific integrated circuit, a digital signal processor, and/or some other suitable type of device. Controller 406 is connected to number of sensors 402 in monitoring device 400. Controller 406 detects analog signals 414 generated by number of sensors 402. Controller 406 converts analog signals 414 into digital signals 416. Either or both of analog signals 414 and digital signals 416 may form measurements 418.

Energy harvesting unit 404 generates electrical energy 422. Electrical energy 422 produces power to power number of sensors 402, controller 406, and wireless communications unit 409. In some illustrative examples, a circuit may be present to control the level of electrical current 426 sent from energy harvesting unit 404 to controller 406. For example, the circuit may control the power provided to controller 406 by controlling the level of voltage and the level of electric current 426 sent to controller 406.

Energy harvesting unit 404 converts mechanical energy 424 into electrical energy 422. Mechanical energy 424 is in the movement and/or expansion of compressed gas 428 in these illustrative examples. Mechanical energy 424 is present in the movement of compressed gas 428 within gas line 412. Additionally, mechanical energy 424 may be present from the expansion of compressed gas 428 in energy harvesting unit 404.

Electrical energy 422 takes the form of electrical current 426. Electrical current 426 is sent to number of sensors 402, controller 406, wireless communications unit 409, and battery system 408.

Battery system 408 includes battery management system 430 and number of batteries 432. Electrical current 426 is used to charge number of batteries 432 through battery management system 430. In some illustrative examples, energy harvesting unit 404 sends electrical current 426 to power controller 406 through battery system 408.

The charging and discharging of number of batteries 432 by battery management system 430 is controlled by controller 406 in these examples. The charging and discharging of number of batteries 432 is controlled using policy 434. Policy 434, in these illustrative examples, contains number of charge curves 436 and number of discharge curves 438. These different curves may be used to charge and discharge, respectively, number of batteries 432 in a manner to improve performance and/or longevity of number of batteries 432.

In these illustrative examples, measurements 418 are sent by wireless communications unit 409 over a wireless communications link to a computer system, such as computer system 346 in FIG. 3.

The illustration of monitoring device 400 in FIG. 4 is not meant to imply physical or architectural limitations to a manner in which different illustrative examples may be implemented. Other components, in addition to and/or in place of the ones illustrated, may be used. Some components may be unnecessary in some illustrative examples. Also, the blocks are presented to illustrate some functional components. One or more of these blocks may be combined and/or divided into different blocks when implemented in different illustrative examples.

For example, in some illustrative examples, wireless communications unit 409 may be implemented as part of controller 406. As another example, in some illustrative examples, battery management system 430 also may be implemented as part of controller 406. In still other illustrative examples, monitoring device 400 may include other components, such as a memory and/or a storage device.

As another example, policy 434 may cause controller 406 to start charging battery system 408 if a charge level in battery system 408 falls below a lower limit and stops charging battery system 408 when the charge level in the battery system exceeds an upper limit. The upper limit and the lower limit may have the same value or different values.

Figure 5:
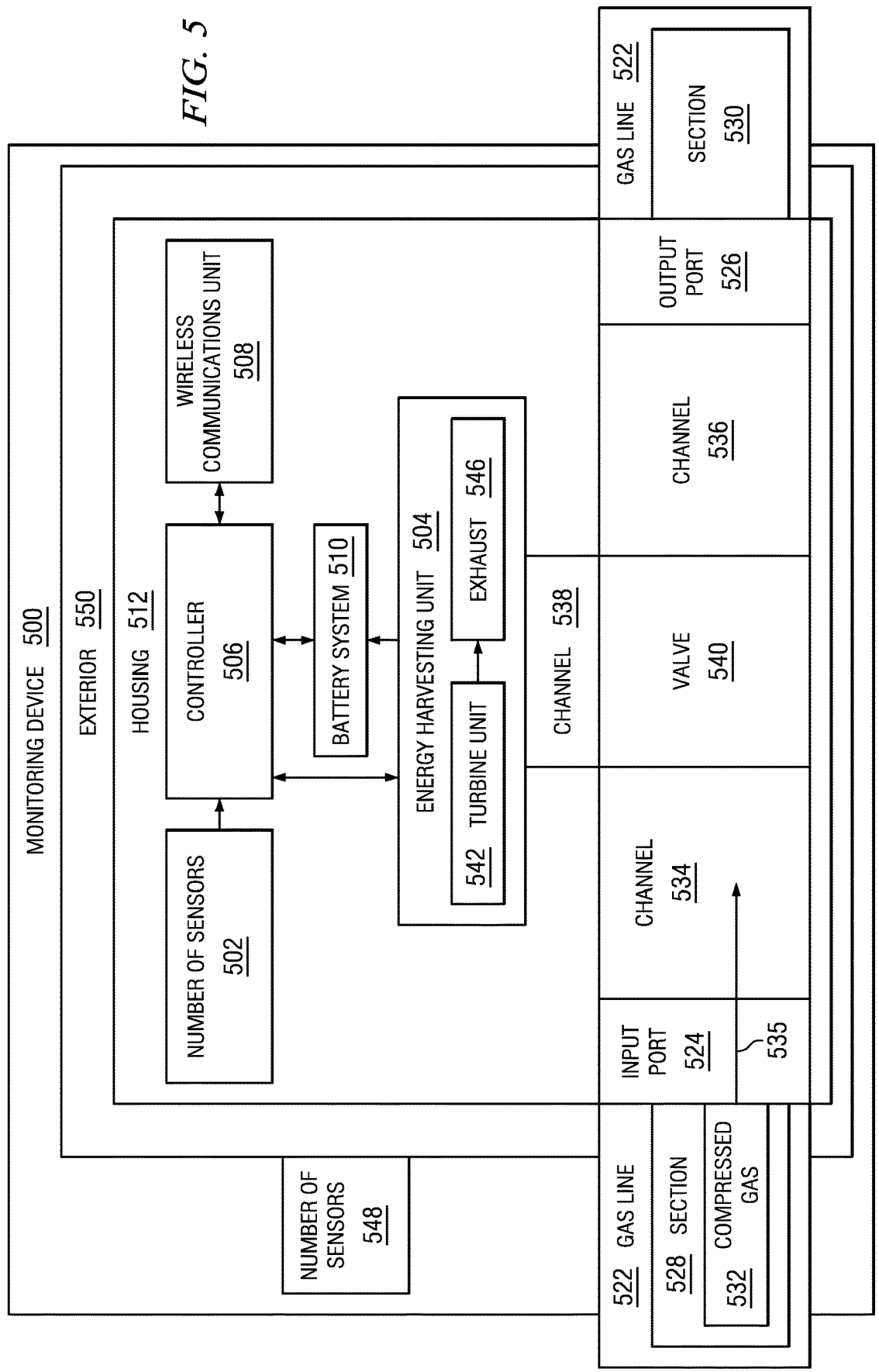
FIG. 5 is an illustration of a monitoring device in accordance with an illustrative example.

Turning now to FIG. 5, an illustration of a monitoring device is depicted in accordance with an illustrative example. Monitoring device 500 is an example of one implementation for number of monitoring devices 334 in FIG. 3 and monitoring device 400 in FIG. 4.

In this illustrative example, monitoring device 500 comprises number of sensors 502, energy harvesting unit 504, controller 506, wireless communications unit 508, battery system 510, and housing 512. Number of sensors 502, energy harvesting unit 504, controller 506, wireless communications unit 508, and battery system 510 are located within housing 512 in these illustrative examples.

As depicted, monitoring device 500 is connected to gas line 522. Gas line 522 is an example of a gas line in gas lines 318 in FIG. 3. Housing 512 has input port 524 and output port 526.

Section 528 of gas line 522 is connected to input port 524. Section 530 of gas line 522 is connected to output port 526. In this illustrative example, compressed gas 532 moves in the direction of arrow 535 within gas line 522 into input port 524 of housing 512. Channel 534, channel 536, and channel 538 are present within housing 512. These channels are configured to facilitate the flow of compressed gas 532 within housing 512.

Channel 534 is connected to input port 524 and valve 540. Channel 536 is connected to valve 540 and output port 526. Channel 538 is connected to valve 540 and energy harvesting unit 504. Valve 540 controls the flow of compressed gas 532 within channels 534, 536, and 538. For example, valve 540 in a first position may prevent gas from flowing through channel 534. In another position, valve 540 may cause compressed gas 532 to flow through channel 534 into channel 536. In another position, valve 540 may cause compressed gas 532 to flow from channel 534 into channel 538. Additionally, valve 540 may have other positions that allow different amounts of compressed gas to flow from channel 534 into both channel 536 and channel 538.

When compressed gas 532 flows through channel 538 into energy harvesting unit 504, energy harvesting unit 504 generates power to power number of sensors 502, controller 506, and wireless communications unit 508. Further, energy harvesting unit 504 also may generate electrical energy to charge battery system 510.

In these examples, the electrical energy is generated in the form of an electrical current. This electrical current, in these examples, flows through battery system 510 into controller 506. Controller 506 is connected to number of sensors 502. Electrical current may flow from controller 506 to number of sensors 502 to provide power to number of sensors 502. In a similar fashion, controller 506 is connected to wireless communications unit 508. Electrical current generated by energy harvesting unit 504 flows through controller 506 to wireless communications unit 508.

In this illustrative example, energy harvesting unit 504 takes the form of turbine unit 542. Turbine unit 542 contains a number of blades, a propeller, and/or some other device that turns as compressed gas 532 passes through energy harvesting unit 504.

Channel 536 leads to exhaust 546 in these illustrative examples. Exhaust 546 is an output port that allows compressed gas 532 to be vented or to escape into the air.

In these illustrative examples, number of sensors 502 is positioned to detect parameters to generate analog signals for measurements of compressed gas 532 as compressed gas 532 passes through channel 536. Additionally, in some illustrative examples, monitoring device 500 also may include number of sensors 548. Number of sensors 548 may be located on exterior 550 of housing 512 or in a remote location to detect other parameters other than parameters with respect to conditions within gas line 522.

For example, number of sensors 548 may detect other parameters such as, for example, temperature, humidity, carbon dioxide levels, and/or other suitable parameters in the environment around or outside of housing 512 of monitoring device 500. In yet other illustrative examples, number of sensors 548 may include a video camera to obtain data regarding the operation of equipment or other objects.

Figure 6:
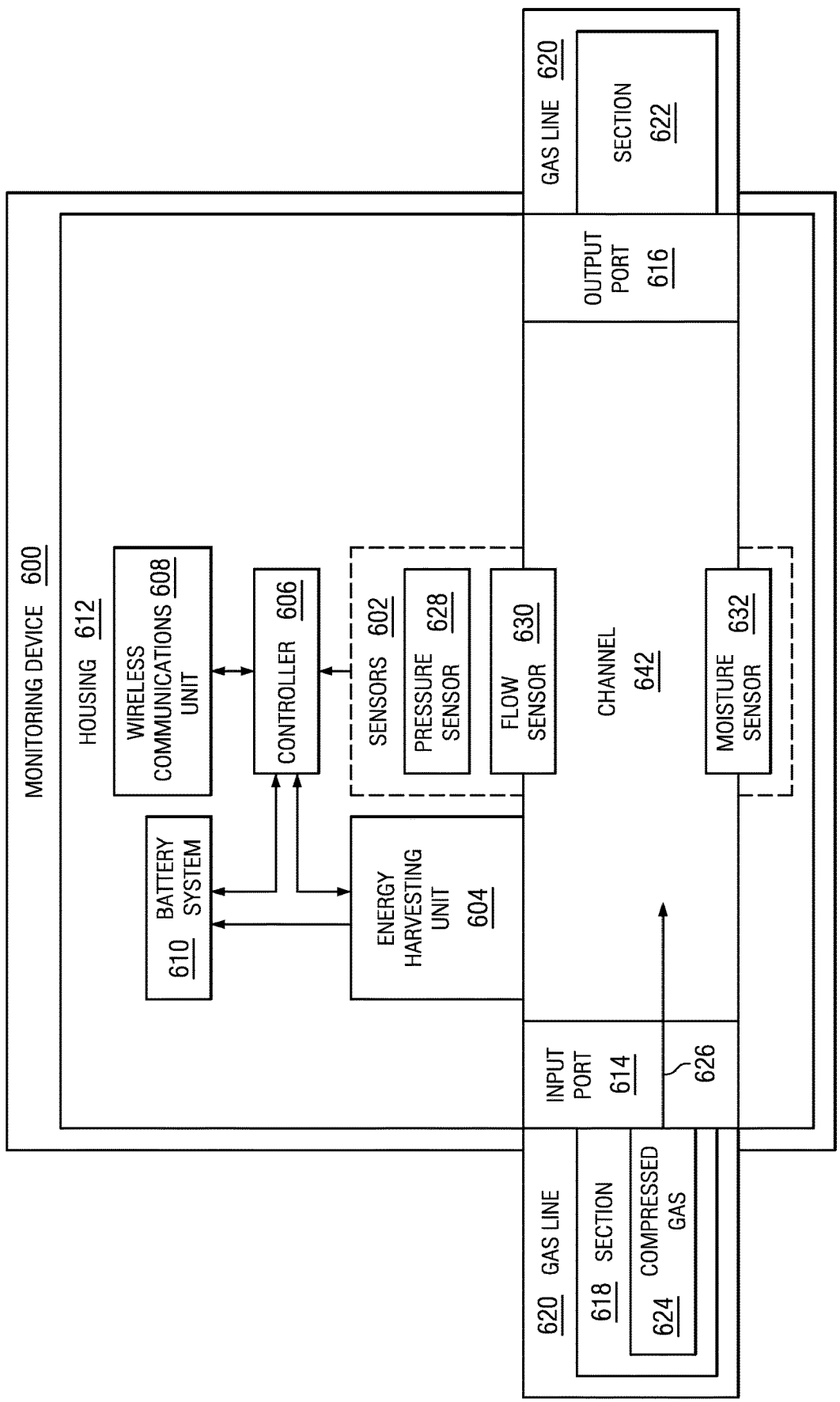
FIG. 6 is an illustration of a monitoring device in accordance with an illustrative example.

With reference now to FIG. 6, an illustration of a monitoring device is depicted in accordance with an illustrative example. Monitoring device 600 is an example of one implementation for number of monitoring devices 334 in FIG. 3 and monitoring device 400 in FIG. 4. As can be seen in this example, monitoring device 600 includes sensors 602, energy harvesting unit 604, controller 606, wireless communications unit 608, battery system 610, and housing 612.

Housing 612 has input port 614 and output port 616. Input port 614 is connected to section 618 of gas line 620. Output port 616 is connected to section 622 of gas line 620. Compressed gas 624 flows through section 618 into input port 614 in the direction of arrow 626. In these illustrative examples, sensors 602 include pressure sensor 628, flow sensor 630, and moisture sensor 632. Sensors 602 detect parameters for compressed gas 624 flowing through channel 642 within housing 612.

Sensors 602 are connected to controller 606, which transmits measurements made using sensors 602 over a wireless communications link using wireless communications unit 608.

Energy harvesting unit 604 is connected to channel 642 and generates electrical energy from the flow of compressed gas 624 in the direction of arrow 626 in channel 642. This electrical energy takes the form of an electrical current that is sent to controller 606 to power controller 606. The electrical current is also sent through battery system 610, which also may store the electrical energy and/or send the electrical energy to controller 606. The current sent to controller 606 is sent to sensors 602 through controller 606 to power sensors 602 in these examples.

The illustration of monitoring device 500 in FIG. 5 and monitoring device 600 in FIG. 6 are only meant as examples of some implementations for number of monitoring devices 334 in FIG. 3 and monitoring device 400 in FIG. 4. Other configurations and components may be present in other illustrative examples other than those shown in monitoring device 500 in FIG. 5 and monitoring device 600 in FIG. 6. For example, in some illustrative examples, input port 524 may be connected to a valve rather than a section of a gas line.

Figure 7:
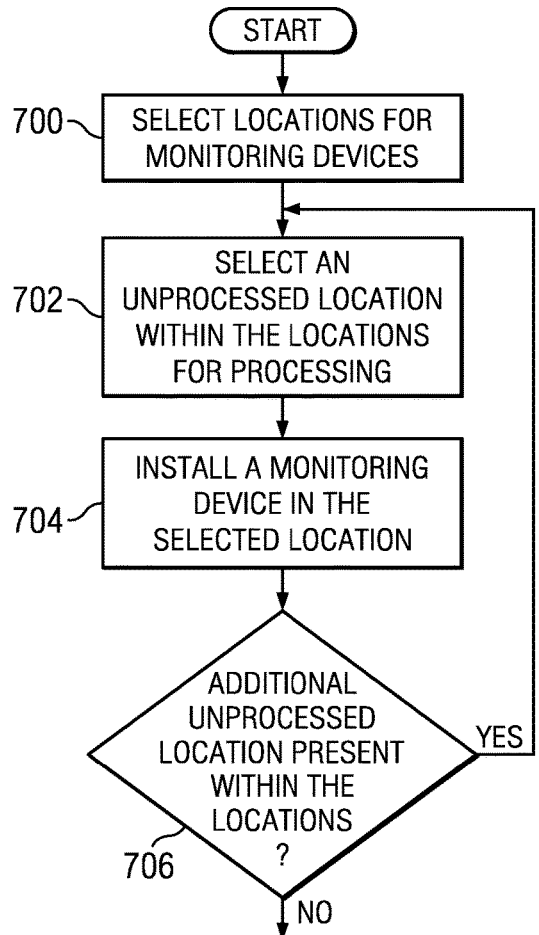
FIG. 7 is a flowchart of a process for installing monitoring devices in accordance with an illustrative example.

With reference now to FIG. 7, a flowchart of a process for installing monitoring devices is depicted in accordance with an illustrative example. The process illustrated in FIG. 7 may be implemented to install monitoring devices in an environment, such as monitoring environment 300 in FIG. 3.

The process begins by selecting locations for monitoring devices (operation 700). Thereafter, an unprocessed location within the locations is selected for processing (operation 702). A monitoring device is installed in the selected location (operation 704). This selected location may be, for example, a gas line, a valve, or some other suitable location. With a gas line, the monitoring device may be inserted in line with the gas line.

Thereafter, a determination is made as to whether an additional unprocessed location is present within the locations (operation 706). If an additional unprocessed location is present, the process returns to operation 702. Otherwise, the process terminates.

Figure 8:
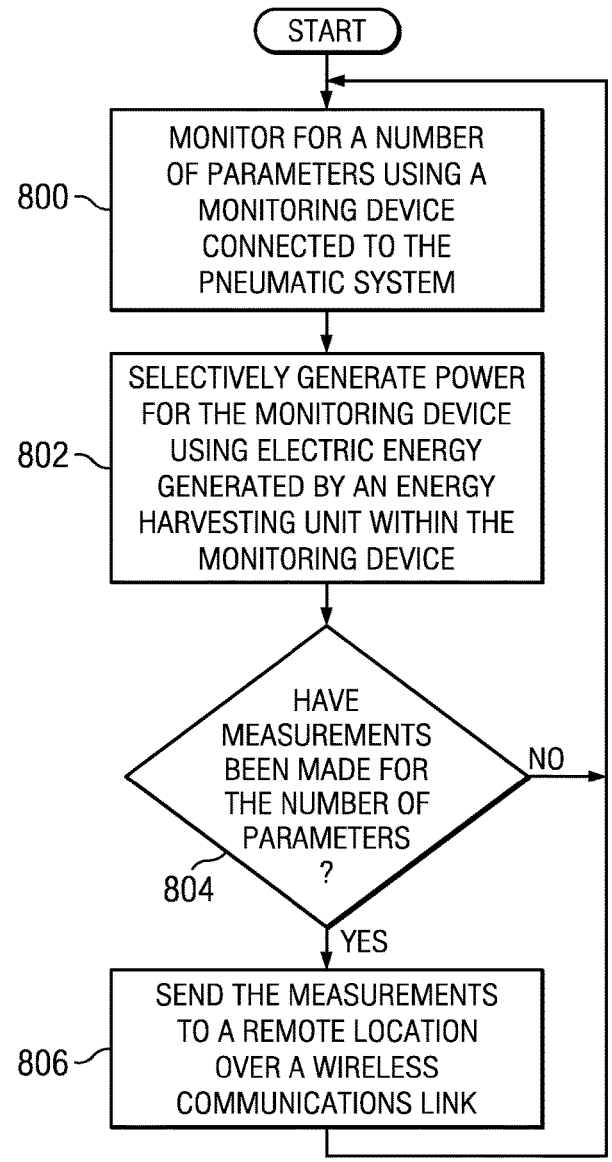
FIG. 8 is a flowchart of a process for monitoring a pneumatic system in accordance with an illustrative example.

With reference next to FIG. 8, a flowchart of a process for monitoring a pneumatic system is depicted in accordance with an illustrative example. The process illustrated in FIG. 8 may be implemented in an environment, such as monitoring environment 300 in FIG. 3 to monitor pneumatic system 312 in FIG. 3.

The process begins by monitoring for a number of parameters using a monitoring device connected to the pneumatic system (operation 800). The process selectively generates power for the monitoring device using electric energy generated by an energy harvesting unit within the monitoring device (operation 802). In this illustrative example, power for the monitoring device may be selectively generated based on a condition, such as the level of charge for a battery system within the monitoring device.

A determination is made as to whether measurements have been made for the number of parameters (operation 804). In these illustrative examples, the measurements may be made by receiving analog signals detected by a number of sensors for the number of parameters. In other illustrative examples, the measurements may be made when the analog signals have been converted into digital signals. In still other illustrative examples, measurements may be considered to be made after some processing of the digital, flash, and/or analog signals has been made. For example, other operations, such as filtering, sampling, and/or other suitable operations may be performed to generate the measurements for operation 804.

If measurements have been made, the process sends the measurements to a remote location over a wireless communications link (operation 806). The process then returns to operation 800 as described above. If measurements have not been made, the process also returns to operation 800 as described above.

Figure 9:
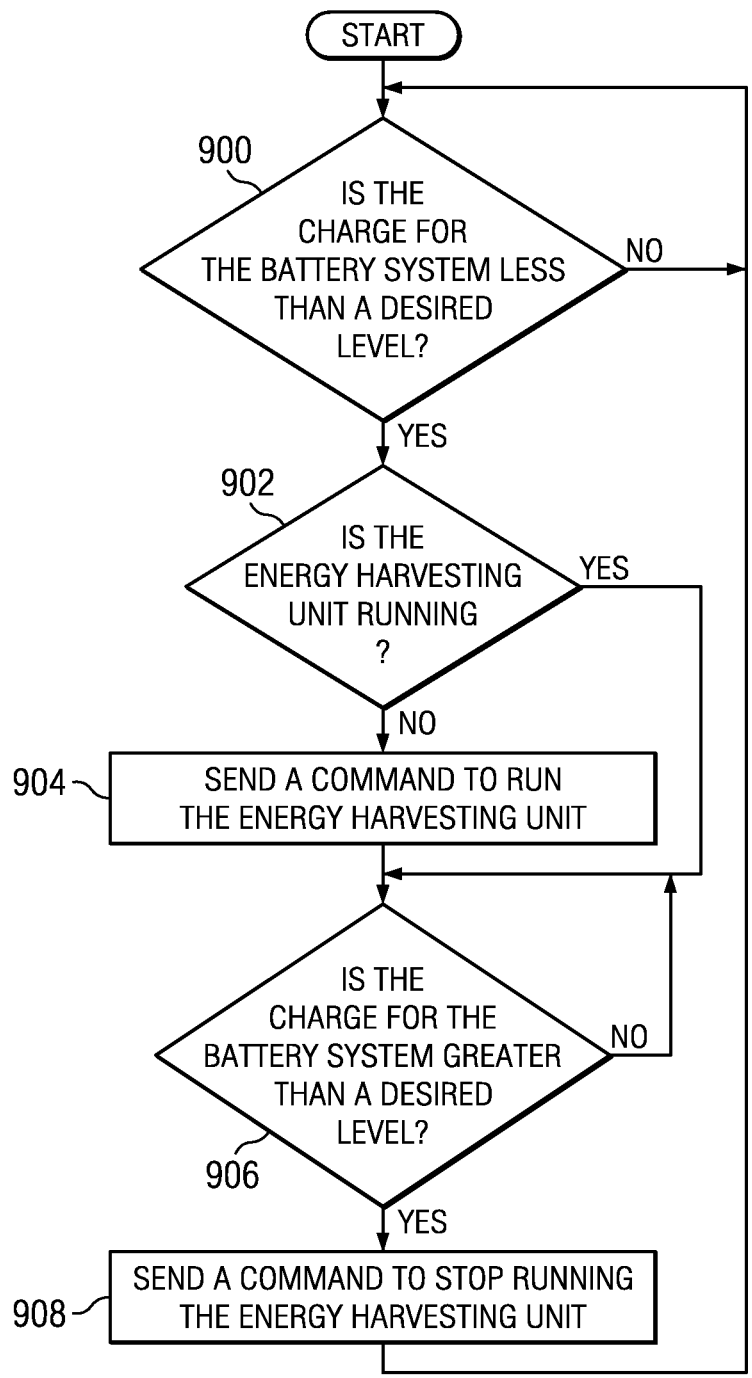
FIG. 9 is an illustration of a flowchart of a process for controlling an energy harvesting unit in accordance with an illustrative example.

With reference now to FIG. 9, an illustration of a flowchart of a process for controlling an energy harvesting unit is depicted in accordance with an illustrative example. The process illustrated in FIG. 9 is a more detailed process for operation 802 in FIG. 8. The process may be implemented with monitoring device 400 in FIG. 4. In particular, the process may be implemented by using controller 406 to control energy harvesting unit 404 in FIG. 4.

The process begins by determining whether the charge for the battery system is less than a desired level (operation 900). The desired level may be selected to increase the life of the battery system. This desired level may be a battery system charge of, for example, without limitation, 0 percent, 10 percent, 20 percent, or some other suitable level of charge. In this illustrative example, the battery system may be implemented using battery system 408 in FIG. 4. Further, controller 406 in FIG. 4 may make the determination based on input received from battery management system 430 in FIG. 4.

If the charge for the battery system is not less than a desired level, the process returns to operation 900. Otherwise, the process determines whether the energy harvesting unit is running (operation 902). In this illustrative example, the energy harvesting unit may not be running if the energy harvesting unit is not receiving power or is idle. If the energy harvesting unit is running, the operation returns to operation 902. Otherwise, if the energy harvesting unit is not running, the process then sends a command to run the energy harvesting unit (operation 904).

Thereafter, the process determines whether the charge for the battery system is greater than a desired level (operation 906). The desired level in operation 904 may be selected to increase the life of the battery system. For example, this desired level may be, without limitation, 80 percent, 90 percent, 100 percent, or some other suitable level of charge.

If the charge for the battery system is not greater than a desired level, the process returns to operation 906. Otherwise, if the charge for the battery system is greater than the desired level, the process sends a command to stop running the energy harvesting unit (operation 908). The energy harvesting unit may stop running when the power for the energy harvesting unit is turned off or when the energy harvesting unit is idle. Thereafter, the process returns to operation 900.

The flowcharts and block diagrams in the different depicted examples illustrate the architecture, functionality, and operation of some possible implementations of apparatus and methods in different illustrative examples. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, the generation of power and the charging of the battery system may be performed at the same time that monitoring for measurements is performed.

Thus, the different illustrative examples provide a method and apparatus for monitoring a pneumatic system. In one illustrative example, an apparatus comprises a number of sensors, an energy harvesting unit, and a controller. The number of sensors is configured to detect a number of parameters. The energy harvesting unit is configured to generate electrical energy from a compressed gas in the pneumatic system. The controller is connected to the number of sensors and the energy harvesting unit. The controller is configured to process measurements for the number of parameters detected by the number of sensors. The number of sensors and the controller are powered by the energy harvesting unit.

The different illustrative examples also provide an ability to monitor different portions of a system, such as a pneumatic system. The monitoring is performed in a manner that reduces the number of wires needed to obtain measurements of desired parameters and send those measurements for processing. Further, the different illustrative examples reduce the number of wires needed to power a system by employing energy harvesting units within the different monitoring systems.

For example, in some illustrative examples, a monitoring device may not need an energy harvesting unit. Instead, the monitoring device may be connected to another monitoring device containing an energy harvesting unit that is configured to provide energy for both monitoring devices.

The illustrative examples also provide for an apparatus including: a number of sensors configured to detect a number of parameters; an energy harvesting unit configured to generate electrical energy from a compressed gas in a pneumatic system; and a controller connected to the number of sensors and the energy harvesting unit, wherein the controller is configured to process measurements for the number of parameters detected by the number of sensors and wherein the number of sensors and the controller are powered by the energy harvesting unit. The apparatus may further include: a battery system configured to store the electrical energy.

The apparatus may further include: a housing having an input and an output, wherein the input is configured to receive the compressed gas in a first section of a gas line and the output is configured to send the compressed gas into a second section in the gas line; a first channel in communication with the input; a second channel in communication with the output; a third channel in communication with the energy harvesting unit; and a valve connected to the first channel, the second channel, and the third channel, wherein the valve is configured to direct a flow of the compressed gas in the first channel to at least one of the second channel and the third channel. For the apparatus wherein the energy harvesting unit may include: a turbine unit configured to generate an electrical current from the flow of the compressed gas through the turbine unit.

In another illustrative example, the apparatus may further include: a computer system, wherein the controller is configured to communicate with the computer system. In another illustrative example, the controller is configured to communicate with a computer system using at least one of a wireless communications link and a wired communications link.

In another illustrative example, the controller is configured to control charging of the battery system using a policy. In this example the policy is configured to cause the controller to start charging the battery system if a charge level in the battery system falls below a lower limit and stops charging the battery system when the charge level in the battery system exceeds an upper limit. However, the policy may be configured to cause the controller to charge and discharge the battery system using a number of charge and discharge curves for the battery system in the policy.

In another illustrative example, the controller is configured to process the measurements by sending the measurements to a computer system. In another illustrative example, the controller is configured to process the measurements by analyzing the measurements. In another illustrative example, the number of parameters is for at least one of the pneumatic system and an environment in which the pneumatic system is located.

In another illustrative example, the controller comprises at least one of an application specific integrated circuit, a central processing unit, and a processor unit. In another illustrative example, the number of sensors comprises at least one of a moisture sensor, a flow sensor, and a pressure sensor. In another illustrative example the apparatus of claim 1 further includes: the pneumatic system.

The illustrative examples also contemplate an apparatus including: a number of sensors configured to detect a number of parameters in a fluid system; an energy harvesting unit configured to generate electrical energy from a fluid in the fluid system; and a controller in communication with the number of sensors and the energy harvesting unit, wherein the controller is configured to process measurements for the number of parameters detected by the number of sensors and control operation of the energy harvesting unit and wherein the number of sensors and the controller are powered by the electrical energy generated by the energy harvesting unit. In an illustrative example, the fluid system is selected from one of a hydraulic system and a pneumatic system.

The illustrative examples also contemplate a method for monitoring a pneumatic system. The method includes: monitoring for a number of parameters using a monitoring device connected to the pneumatic system, wherein the monitoring device comprises a number of sensors configured to detect the number of parameters; an energy harvesting unit configured to generate electrical energy from a gas in the pneumatic system; and a controller in communication with the number of sensors and the energy harvesting unit, wherein the controller is configured to process measurements for the number of parameters detected by the number of sensors and control operation of the energy harvesting unit; and powering the monitoring device using the electrical energy generated by the energy harvesting unit. In another illustrative example, the method also includes sending the measurements to a remote location.

In another illustrative example, the measurements are received from the number of sensors as analog signals and the controller converts the analog signals into digital signals.

In another illustrative example, the measurements are sent to the remote location over a wireless communications link.

In another illustrative example, the method may further include installing the monitoring device in the pneumatic system. In another illustrative example the method may further include charging a battery system in the monitoring device using the energy harvesting unit. In another illustrative example, the number of sensors and the controller are powered by the energy harvesting unit.

The illustrative examples also contemplate a method and apparatus for monitoring a pneumatic system. A number of parameters are monitored using a monitoring device connected to the pneumatic system, an energy harvesting unit configured to generate electrical energy from a gas in the pneumatic system, and a controller. The monitoring device comprises a number of sensors configured to detect the number of parameters. The controller is in communication with the number of sensors and the energy harvesting unit and is configured to process measurements for the number of parameters detected by the number of sensors and control operation of the energy harvesting unit. The number of sensors and the controller are powered by the energy harvesting unit. The monitoring device is powered using the electrical energy generated by the energy harvesting unit.

Figure 10:
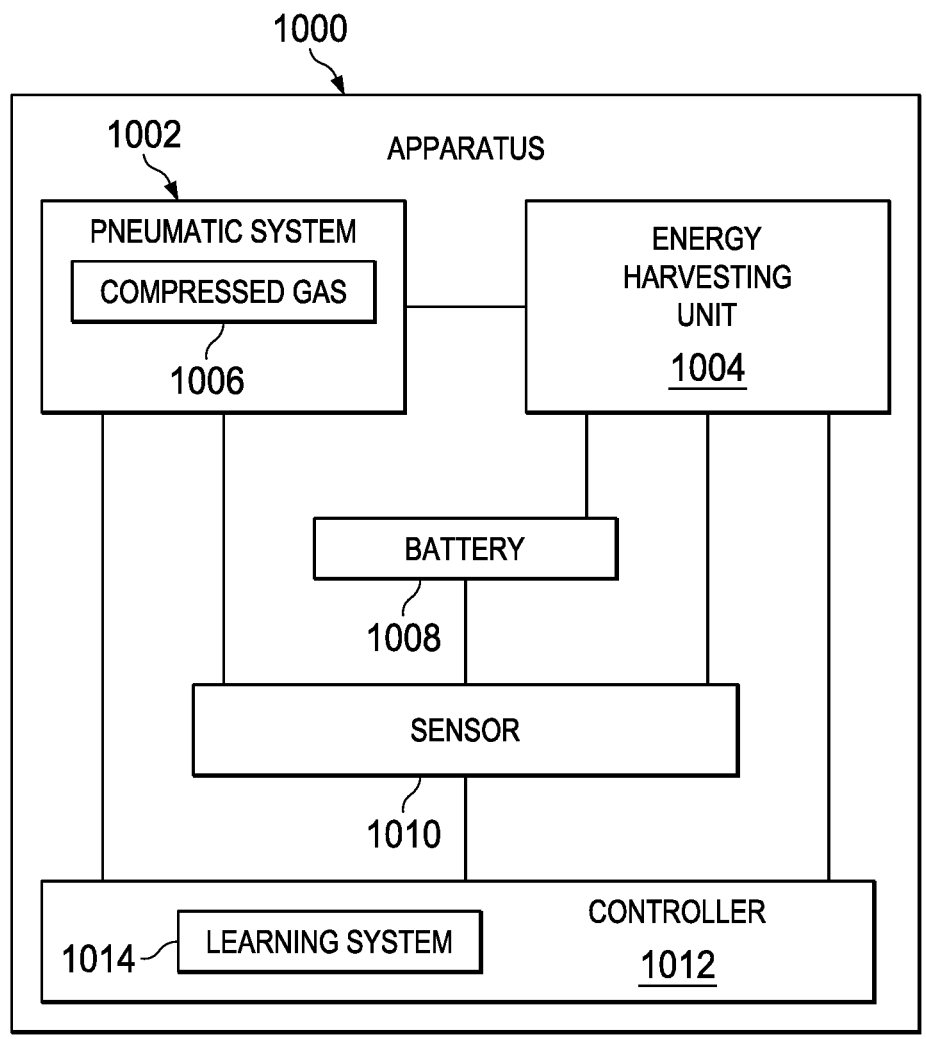
FIG. 10 is a block diagram of an apparatus for controlling a pneumatic system with an energy harvesting unit in accordance with an illustrative example.

FIG. 10 is a block diagram of an apparatus for controlling a pneumatic system with an energy harvesting unit depicted in accordance with an illustrative example. Apparatus 1000 may be an extension of the apparatus described above with respect to FIG. 1 through FIG. 9.

Apparatus 1000 includes pneumatic system 1002 and energy harvesting unit 1004. Energy harvesting unit 1004 is configured to generate electrical energy from compressed gas 1006 in pneumatic system 1002. Apparatus 1000 also includes battery 1008 connected to energy harvesting unit 1004.

Apparatus 1000 also includes sensor 1010 disposed to detect a parameter regarding operation of energy harvesting unit 1004. Apparatus 1000 also includes controller 1012 connected to sensor 1010 and energy harvesting unit 1004.

Sensor 1010 and controller 1012 are powered by energy harvesting unit 1004. Controller 1012 is configured to control energy harvesting unit 1004 and to process measurements for the parameter detected by sensor 1010. Controller 1012 is further programmed with learning system 1014, which is configured to diagnose an operational condition of energy harvesting unit 1004 or pneumatic system 1002 based on the measurements for the parameter, and to issue a command to controller 1012 based on the operational condition.

The example shown in FIG. 10 may be varied. For example, in an illustrative example, the operational condition is a probability of failure of the energy harvesting unit and the command is to cause the controller to issue an alert. The operational condition may also be a need for more power. In another illustrative example, the operational condition is a pattern of use of the pneumatic system, and wherein the command is to cause the energy harvesting unit to store energy in the battery when the pneumatic system is expected to be unused. In another illustrative example, the operational condition is a need for more power to be stored in the battery prior to ordinary recharging times and further includes use patterns of the pneumatic system, and wherein the command is to cause the energy harvesting unit to store energy in the battery between uses of the pneumatic system.

In a related illustrative example, the controller is further programmed to predict an amount of time the pneumatic system would need to be operated to provide enough power to extend operation of the energy harvesting unit until a next time window when a full charge in the battery could be acquired without operational interruptions of the pneumatic system. In another related illustrative example, the controller is configured to use the learning system to determine times when threshold amounts of power from the pneumatic system over multiple time intervals could be drawn from the pneumatic system and transferred to the energy harvesting unit to generate power that sums up over the time interval to a specified charge for the battery. In yet another related illustrative example, the controller is further configured to operate the pneumatic system to divert the threshold amounts of power at the multiple time intervals.

In a different illustrative example, the apparatus further includes a second pneumatic system; a second energy harvesting unit configured to generate electrical energy from a compressed gas in the second pneumatic system; a second battery connected to the second energy harvesting unit; and a second sensor disposed to detect a second parameter regarding a second operation of the second energy harvesting unit. The pneumatic system and the second pneumatic system share a common gas line. The controller is in communication with the second pneumatic system, the second energy harvesting unit, the second battery, and the second sensor. The controller is further configured to coordinate charging times between the battery and the second battery based on the first parameter and the second parameter.

In this example, the controller is further configured to control venting of gas from the common gas line. In an additional example, the controller is further configured to prevent charging of the battery and the second battery at a same time.

Thus, the illustrative examples provide for diagnostics and prognostics of systems that provide extended value with consideration to assets that are difficult to reach, maintain, or are critical to production. The illustrative examples provide extended capabilities to the pneumatic energy harvesting and monitoring system described in FIG. 1 through FIG. 9 by providing valuable insight into system performance and time-to-failure metrics. The illustrative examples allow for alerts to be generated upon the detection of faults in the harvesting system, energy storage system, the pneumatic system under surveillance, and any valve body actuation or actuators involved in enabling charging of the system.

The illustrative examples would then be capable of detecting both simple and complex failure of the harvester or the pneumatic systems performance to allow for alerts, trending, and estimation of failure times for the benefit of the system operators and maintainers. Additionally, the use of the prognostics data along with the overall network of harvesting and monitoring devices provide a method for scheduling charging times over the population of multiple devices to avoid operational impacts to a manufacturing environment and optimization of charging needs versus capacity.

Figure 11:
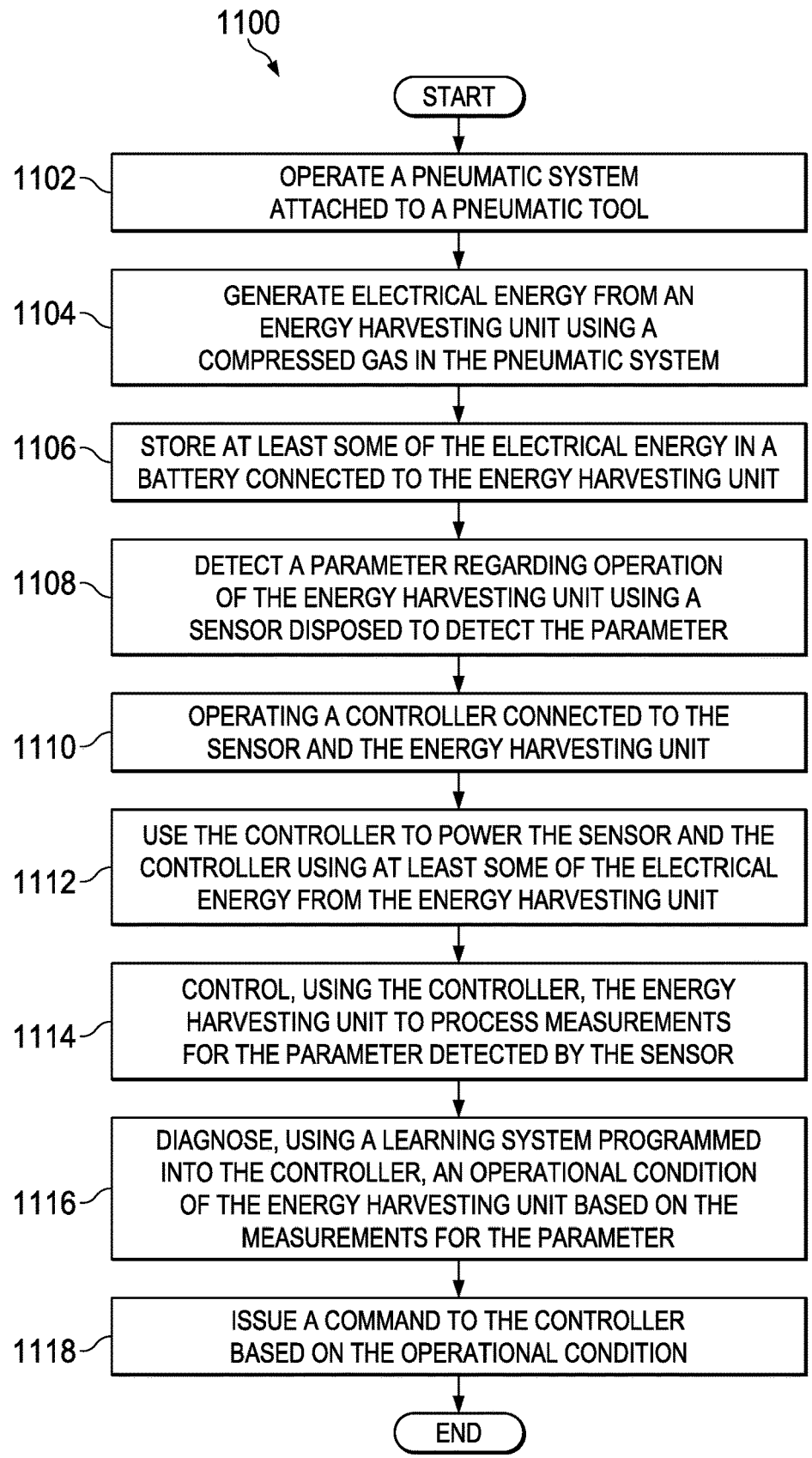
FIG. 11 is a flowchart of a method for controlling a pneumatic system and an energy harvesting device in accordance with an illustrative example.
Figure 12:
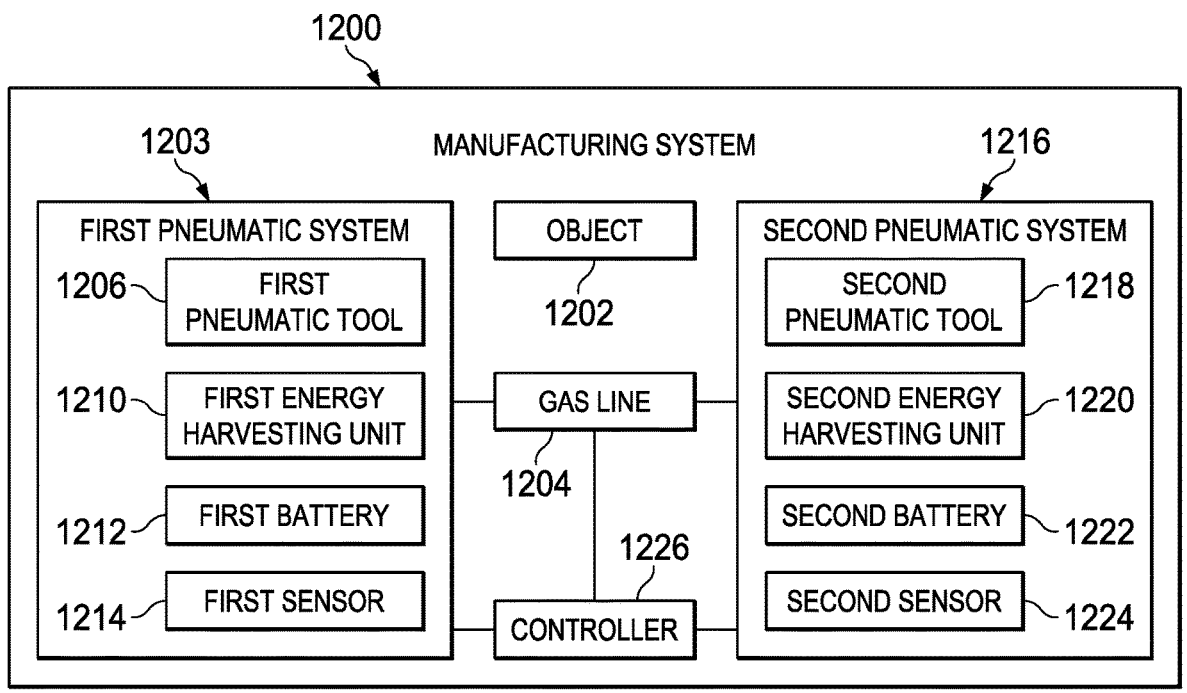
FIG. 12 is a block diagram of a manufacturing system in accordance with an illustrative example.

Accordingly, the illustrative examples described in FIG. 10 through FIG. 12 are an extension of the illustrative examples described with respect to FIG. 1 through FIG. 9. This illustrative example provides prognostics and diagnostics capability to the previously described energy harvesting and monitoring system. The illustrative examples also provide the basis for methods for interoperability in terms of scheduling coupled with prognostics for developing optimal battery charging times and durations.

The illustrative examples also provide the ability to diagnose and predict the charging capacity of the battery, the stiction of the valve body, solenoid amperage range overloads, and the flow capacity of the pneumatic channel, among others. Through prediction of these parameters, the energy level needed to actuate the valve and the needed energy reserves and charging times can be determined to accurately schedule the desired or needed charging times and capacities.

These capabilities to use model based diagnostics allow for the system to intelligently provide alerts and estimated times-to-failures of failure modes. These alerts could then be used to determine how to dispatch maintenance, degradation of pneumatic performance, and impact to down-stream processes and systems.

The illustrative examples contemplate monitoring many different variables. Example variables include but are not limited to pressure, moisture, particulate, flow, battery level, stiction of solenoid valve, solenoid amperage, battery remaining lifetime, operational patterns of both the energy harvesting unit and the pneumatic system including any pneumatic tools connected to the pneumatic system, and possibly many others.

The illustrative examples also can estimate the operational window of the device to provide early warning for failure of solenoid valves and battery capacity issues. The illustrative examples also contemplate identification of conditions that lead to failure modes. The illustrative examples can also be used to update a parametric model of the system to determine the energy levels needed for valve actuation and how long it will take to charge the system battery.

The illustrative examples also contemplate distributed monitoring and scheduling of when to charge the battery population dependent on usage of air lines and learned production behaviors. Thus, the illustrative examples may manage scheduling of charging using a number of algorithms, with the goal to impose little to no impact to production operations in a manufacturing environment due to the need to charge batteries using the air capacity of a given line or branch. In a plant with continuous operations, without the illustrative examples, charging of batteries by the previously proposed system designed to harvest energy can lead to interruption of pneumatic services that would be undesirable. The illustrative examples can mitigate this issue using a combination of prognostics and scheduling technologies in the controller to enable optimal charging times and charging duty cycles.

For instance, the simple case is to charge the battery when the line has not had usage in a specified period of time. This case can be solved with a simple timer by a single harvesting and monitoring system. This simple timer might lead to the undesirable behavior of using air capacity at times when the timer has just expired but someone is about to use the gas line of the pneumatic system.

To prevent such instances, the illustrative examples provide for a distributed network of the harvester, monitor, and controller to learn the usage patterns across a facility or sub-section of a facility and to work to reduce the impacts to operations. The illustrative examples contemplate programming the controller with learning methods, such as neural networks or other suitable artificial intelligence. The illustrative examples also contemplate using this artificial intelligence to create a prognostic projection of the capacity of the battery and the charging time needed or desired. The controller can command the system remotely as to when the best time to charge would be. If a charge needed to be applied at a time when it may be inconvenient, the controller can predict the needed or desired amount of time the harvester would need to be run to provide enough power to operate the unit until the next charging time window (when a full charge could be acquired without operational interruptions). However, the illustrative examples also contemplate that learned windows of charging times could be used to take small amounts of power from the air lines, with the charging times producing a net power that sums up to a small but useful battery charge. The term "small" in this case means 50 percent or less of full battery capacity.

Additionally, in the case when multiple monitoring units are in-line on the same pneumatic air branch, coordination of charging times may be required or desired to allow each one to vent the correct amount of air flow to provide the recharging energy to a given battery. This operation would also prevent all of the units attempting to charge at the same time and thereby compromising the system performance.

Thus, the illustrative examples provide a scalable and error detecting method to track pneumatic performance across large areas. The new capabilities provided by the illustrative examples increase the value of pneumatic systems with energy harvesting units through a series of variable tracking and projections along with scheduling the charging times across a large area to ensure less or no interference in air supply for operations.

FIG. 11 is a flowchart of a method for controlling a pneumatic system and an energy harvesting device, in accordance with an illustrative example. Method 1100 may be implemented using apparatus 1000 of FIG. 10. Method 1100 may be used in a manufacturing system, such as manufacturing system 1200 of FIG. 12.

Method 1100 may begin by operating a pneumatic system attached to a pneumatic tool (operation 1102). Method 1100 also includes generating electrical energy from an energy harvesting unit using a compressed gas in the pneumatic system (operation 1104).

Method 1100 also includes storing at least some of the electrical energy in a battery connected to the energy harvesting unit (operation 1106). Method 1100 also includes detecting a parameter regarding operation of the energy harvesting unit using a sensor disposed to detect the parameter (operation 1108). Method 1100 also includes operating a controller connected to the sensor and the energy harvesting unit (operation 1110).

Operation 1110 may include a series of operations. Thus, operation 1110 may include using the controller to power the sensor and the controller using at least some of the electrical energy from the energy harvesting unit (operation 1112). Operation 1110 may also include controlling, using the controller, the energy harvesting unit to process measurements for the parameter detected by the sensor (operation 1114). Operation 1110 may also include diagnosing, using a learning system programmed into the controller, an operational condition of the energy harvesting unit based on the measurements for the parameter (operation 1116). Operation 1110 may also include issuing a command to the controller based on the operational condition (operation 1118). The process terminates thereafter.

Method 1100 may be varied. For example, for method 1100 the operational condition may be a probability of failure of the energy harvesting unit, and wherein the command is to cause the controller to issue an alert. In another illustrative example, the operational condition may be a pattern of use of the pneumatic system and wherein the command is to cause the energy harvesting unit to store energy in the battery when the pneumatic system is expected to be unused. In yet another illustrative example, the operational condition comprises a need for more power to be stored in the battery prior to ordinary recharging times and further includes use of patterns of the pneumatic system, and wherein the command is to cause the energy harvesting unit to store energy in the battery between uses of the pneumatic system.

In a different illustrative example, operation of the controller further includes predicting an amount of time the pneumatic system would need to be operated to provide enough power to extend operation of the energy harvesting unit until a next time window when a full charge in the battery could be acquired without operational interruptions of the pneumatic system. In a still different illustrative example, operation of the controller further includes the controller using the learning system to determine times when threshold amounts of power from the pneumatic system over multiple time intervals could be drawn from the pneumatic system and transferred to the energy harvesting unit to generate power that then sums up over the time interval to a specified charge for the battery. In yet another illustrative example, the controller issues commands to the pneumatic system to divert the threshold amounts of power at the multiple time intervals.

The illustrative examples also contemplate the controller controlling multiple pneumatic systems. Thus, for example, method 1100 may also include operating a second pneumatic system. In this example, method 1100 may also include operating a second energy harvesting unit to generate electrical energy from a compressed gas in the second pneumatic system. In this example, method 1100 may also include operating a second battery connected to the second energy harvesting unit. In this example, method 1100 may also include operating a second sensor disposed to detect a second parameter regarding a second operation of the second energy harvesting unit.

The pneumatic system and the second pneumatic system share a common gas line. The term "share a common gas line" contemplates both a directly shared gas line, as well as different branches of a pneumatic system fed from a common point, as well as a pneumatic system in which a controller controls a first gas line that is separate from a second gas line depending on conditions in the other gas line.

The controller is in communication with the second pneumatic system, the second energy harvesting unit, the second battery, and the second sensor. In this example, method 1100 may also include coordinating, using the controller, charging times between the battery and the second battery based on the first parameter and the second parameter.

While the above examples describe first and second systems, the illustrative examples also contemplate many more than two pneumatic systems in a network. Thus, as can be seen, the illustrative examples may be varied. Accordingly, the illustrative examples are not necessarily limited to the examples described above.

FIG. 12 is a block diagram of a manufacturing system depicted in accordance with an illustrative example. Manufacturing system 1200 may be used to manufacture object 1202. Object 1202 may be any article of manufacture, but manufacturing system 1200 specifically contemplates the manufacture of aircraft and components for use in aircraft or for use in the manufacture of aircraft.

Thus, manufacturing system 1200 includes first pneumatic system 1203 connected to gas line 1204 and to first pneumatic tool 1206. First pneumatic tool 1206 is configured for use in manufacturing of object 1202. First pneumatic system 1203 includes first energy harvesting unit 1210, which is configured to use gas from gas line 1204 to generate electrical energy. First pneumatic system 1203 also includes first battery 1212 connected to first energy harvesting unit 1210, and first sensor 1214 disposed to detect a first parameter regarding operation of first pneumatic system 1203.

Manufacturing system 1200 also includes second pneumatic system 1216 connected to gas line 1204 and to second pneumatic tool 1218. Second pneumatic tool 1218 is configured for use in manufacturing object 1202. Second pneumatic system 1216 includes second energy harvesting unit 1220, which is configured to use gas from gas line 1204 to generate electrical energy. Second pneumatic system 1216 also includes second battery 1222 connected to second energy harvesting unit 1220. Second pneumatic system 1216 also includes second sensor 1224 disposed to detect a second parameter regarding operation of second pneumatic system 1216.

Manufacturing system 1200 also includes controller 1226 in communication with first pneumatic system 1203 and second pneumatic system 1216. Controller 1226 is programmed to monitor the first parameter and the second parameter, and to control operation of at least two of first pneumatic system 1203, second pneumatic system 1216, and gas line 1204 based on an analysis of the first parameter and the second parameter.

Manufacturing system 1200 may be varied. For example, controller 1226 may be configured to coordinate operational times of at least two of first pneumatic system 1203, second pneumatic system 1216, and gas line 1204 such that first battery 1212 is not charged at a same time when second battery 1222 is charged.

Further variations of manufacturing system 1200 are contemplated. For example, the various devices described with respect to apparatus 1000 of FIG. 10 may be used in manufacturing system 1200. Likewise, the techniques described with respect to FIG. 11 may be used in manufacturing system 1200. Thus, the illustrative examples are not necessarily limited by the specific examples given above.

Figure 13:
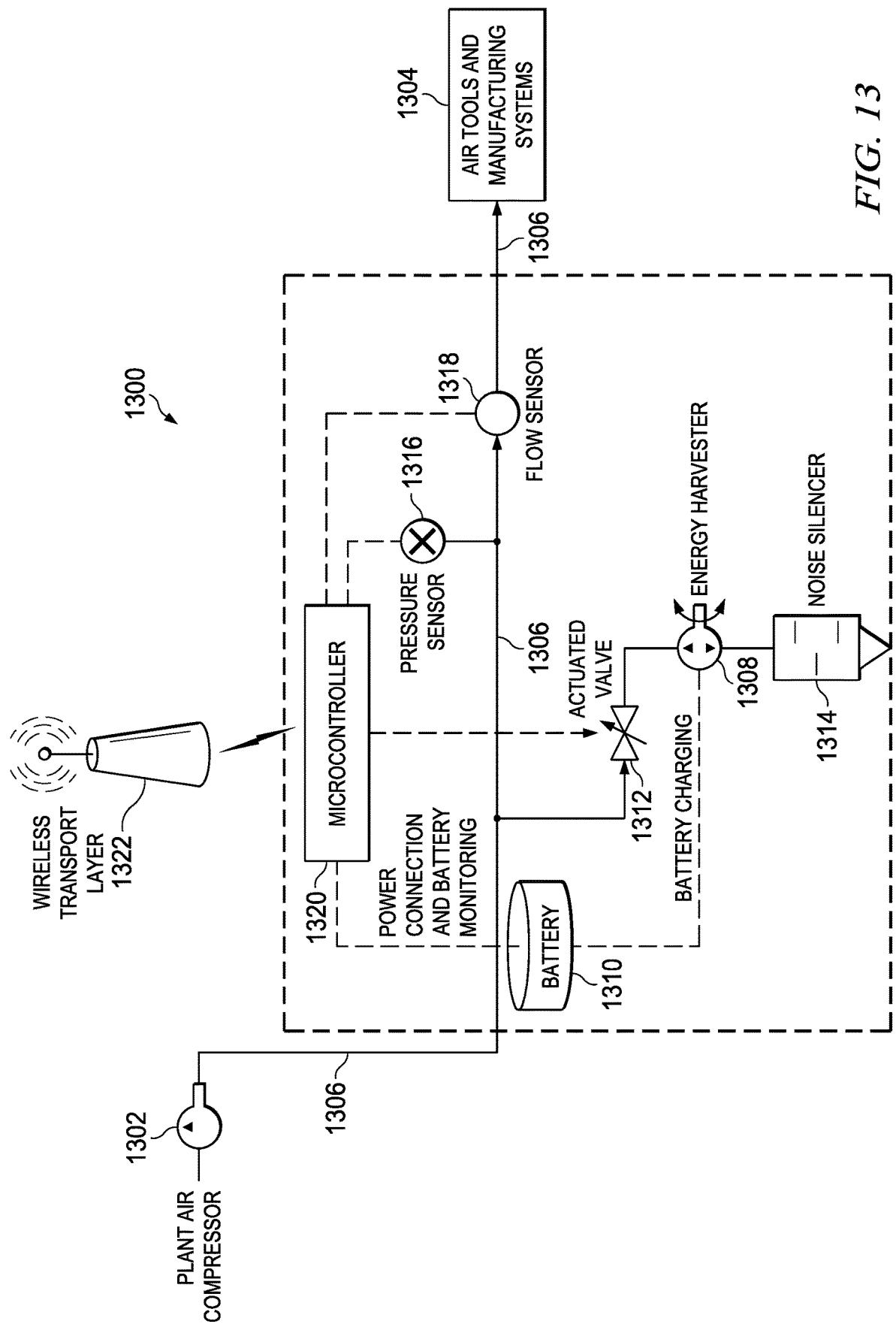
FIG. 13 is a block diagram of a system for controlling a pneumatic device with an energy harvesting device in accordance with an illustrative example.

FIG. 13 is a block diagram of a system for controlling a pneumatic device with an energy harvesting device depicted in accordance with an illustrative example. System 1300 may be an example of pneumatic system 312 of FIG. 3, monitoring device 500 of FIG. 5, monitoring device 600 of FIG. 6, and apparatus 1000 of FIG. 10. System 1300 may also be part of manufacturing system 1200 of FIG. 12.

System 1300 may include plant air compressor 1302. Plant air compressor 1302 is referred to as a "plant" air compressor because, in this specific example, plant air compressor 1302 provides compressed air to an entire area of a plant or manufacturing facility. In other illustrative examples, plant air compressor 1302 may be an individual or less powerful air compressor. Plant air compressor 1302 may be multiple air compressors working together.

System 1300 also includes air tools and manufacturing systems 1304. Air tools and manufacturing systems 1304 includes tools and other manufacturing systems that use compressed air from plant air compressor 1302 on air line 1306. Many tools may be connected to air line 1306. Air line 1306 need not be a single line, but may be multiple air lines that lead to plant air compressor 1302. One, non-limiting objective of the illustrative examples is to recover some of the energy of compressed air within air line 1306.

Thus, system 1300 also includes energy harvester 1308. Energy harvester 1308 is a device which can transform the energy from pressurized gas in line 1306 into electrical energy. In turn, the electrical energy may be stored in battery 1310, which is connected to energy harvester 1308.

To control operation of system 1300, additional devices are present. For example, actuated valve 1312 may be provided in order to increase, decrease, or stop transfer of pressure or gas to energy harvester 1308. Noise silencer 1314 may be connected to energy harvester 1308 to reduce the amount of noise generated by energy harvester 1308.

Additionally, pressure sensor 1316 may be provided to sense pressure in air line 1306. Flow sensor 1318 may also be present to sense an amount of gas flow within air line 1306. More or fewer sensors may be present, and possibly present at different points along air line 1306, or possibly along individual lines within the main line that is air line 1306. In one illustrative example, pressure sensor 1316 and flow sensor 1318 may be a single combined sensor.

The overall controller for system 1300 is microcontroller 1320. Microcontroller 1320 may be a processor or other computer, and may be capable of processing both analog and digital input and output signals. Microcontroller 1320 may be as described above with respect to FIG. 1 through FIG. 12, such as, for example, controller 1012 of FIG. 10, the controller described with respect to method 1100 of FIG. 11, or controller 1226 of FIG. 12. Microcontroller 1320 may be connected to other components of system 1300, including pressure sensor 1316, flow sensor 1318, battery 1310, energy harvester 1308, and actuated valve 1312. In this manner, microcontroller 1320 may be used to control operation of energy harvester 1308 based on measurements taken by pressure sensor 1316 and flow sensor 1318. In an illustrative example, microcontroller 1320 may draw power exclusively from battery 1310 such that system 1300 is a self-contained unit. Microcontroller 1320 may also control actuated valve 1312 when either pressure or flow reach pre-determined amounts or thresholds.

In addition, microcontroller 1320 may also be attached to wireless transport layer 1322. Wireless transport layer 1322 may be replaced with a wired connection in some illustrative examples. However, wireless transport layer 1322 represents a convenient way for a remote computer or portable computer to wirelessly communicate with microcontroller 1320. In this manner, a user or a remote server may change the operation of microcontroller 1320 and thereby change operation and energy harvesting activities of system 1300.

Other variations are possible. For example, more or fewer components, or different components, may be present. Thus, the claimed examples are not necessarily limited to the example provided with respect to FIG. 13.

The description of the different illustrative examples has been presented for purposes of illustration and description, and it is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An apparatus comprising:
   an energy harvesting unit configured to generate electrical energy from a compressed gas in a pneumatic system;
   a battery connected to the energy harvesting unit;
   a sensor configured to detect a first parameter regarding operation of the energy harvesting unit; and
   a controller connected to the sensor and the energy harvesting, unit, wherein:
      the sensor and the controller are powered by the energy harvesting unit;
      the controller is configured to control the energy harvesting unit and to process measurements for the first parameter detected by the sensor;
      the controller is programmed with a learning system configured to:
         diagnose an operational condition of the energy harvesting unit based on the measurements for the first parameter;
         issue a command to the controller based on the operational condition; and
         predict a charging capacity of the battery; and
      at least one of:
         predict a stiction of a valve body in the pneumatic system;
         predict an amperage range overload for a solenoid in the pneumatic system; or
         predict a flow capacity of a channel in the pneumatic system,
      wherein:
         the operational condition comprises a need for more power to be stored in the battery prior to ordinary recharging times and further includes use patterns of the pneumatic system; and
         the command is to cause the energy harvesting unit to store energy in the battery,
   wherein the controller is further configured to operate the pneumatic system to divert threshold amounts of power at multiple time intervals determined by the learning system.

2. A method comprising:
   operating a pneumatic system attached to a pneumatic tool;
   generating electrical energy from an energy harvesting unit using a compressed gas in the pneumatic system;
   storing at least some of the electrical energy in a battery connected to the energy harvesting unit;
   detecting a first parameter regarding operation of the energy harvesting unit using a sensor disposed to detect the first parameter; and
   operating a controller connected to the sensor and the energy harvesting unit, and wherein operation of the controller includes the controller:
      powering the sensor and the controller using at least some of the electrical energy from the energy harvesting unit;
      controlling the energy harvesting unit to process measurements for the first parameter detected by the sensor;
      using a learning system to diagnose an operational condition of the energy harvesting unit based on the measurements for the first parameter;
      issuing a command to the controller based on the operational condition; and
      predicting a charging capacity of the battery; and at least one of: a stiction of a valve body in the pneumatic system, an amperage range overload for a solenoid in the pneumatic system, or a flow capacity of a channel in the pneumatic system,
   wherein the operational condition comprises a pattern of use of the pneumatic system and wherein the command is to cause the energy harvesting unit to store energy in the battery when the pneumatic system is expected to be unused, further comprising:

the controller issuing commands to the pneumatic system to divert threshold amounts of power at multiple time intervals determined by the learning system.

3. A method comprising:

operating a pneumatic system attached to a pneumatic tool;

generating electrical energy from an energy harvesting unit using a compressed gas in the pneumatic system;

storing at least some of the electrical energy in a battery connected to the energy harvesting unit;

detecting a first parameter associated with operation of the energy harvesting unit, wherein the first parameter is detected with a sensor; and operating a controller connected to the sensor and the energy harvesting unit, wherein operation of the controller includes the controller:

powering the sensor and the controller using at least some of the electrical energy from the energy harvesting unit;

controlling the energy harvesting unit to process measurements for the first parameter detected by the sensor;

using a learning system to diagnose an operational condition of the energy harvesting unit based on the measurements for the first parameter;

issuing a command to the controller based on the operational condition, wherein:

the operational condition comprises a probability of failure of the energy harvesting unit and wherein the command is to cause the controller to issue an alert; and the controller uses the learning system to determine times when threshold amounts of power from the pneumatic system over multiple time intervals can be drawn from the pneumatic system and transferred to the energy harvesting unit to generate power that sums up over the multiple time intervals to a specified charge for the battery; and using the learning system to predict a charging capacity of the battery, a flow capacity of a channel in the pneumatic system, and at least one of a stiction of a valve body in the pneumatic system, or an amperage range overload for a solenoid in the pneumatic system, further comprising:

the controller issuing commands to the pneumatic system to divert the threshold amounts of power at the multiple time intervals determined by the learning system.

\* \* \* \* \*